(12) United States Patent
Meylan et al.

(10) Patent No.: US 8,265,640 B2
(45) Date of Patent: Sep. 11, 2012

(54) BSR PROHIBIT TIMER

(75) Inventors: Arnaud Meylan, Bois-Colombes (FR); Sai Yiu Duncan Ho, San Diego, CA (US); Aleksandar Damnjanovic, Del Mar, CA (US)

(73) Assignee: Qualcomm Incorporated, San Diego, CA (US)

( * ) Notice: Subject to any disclaimer, the term of this patent is extended or adjusted under 35 U.S.C. 154(b) by 464 days.

(21) Appl. No.: 12/435,726

(22) Filed: May 5, 2009

(65) Prior Publication Data
US 2009/0280798 A1    Nov. 12, 2009

Related U.S. Application Data

(60) Provisional application No. 61/051,264, filed on May 7, 2008.

(51) Int. Cl.
*H04W 72/00* (2009.01)
(52) U.S. Cl. .............. 455/450; 455/425.1; 455/452.2; 370/328; 370/329; 370/330; 370/339
(58) Field of Classification Search ............ 455/450, 455/452.1, 452.2; 370/328–339
See application file for complete search history.

(56) References Cited

U.S. PATENT DOCUMENTS

| 7,974,310 B2 * | 7/2011 | Chun et al. ............. 370/474 |
| 2009/0154417 A1 * | 6/2009 | Wu et al. ............. 370/329 |

OTHER PUBLICATIONS

"Triggering of Scheduling Request", 3GPP TSG-RAN WG2#62 Tdoc, R2-082453, Kansas City, USA, May 5-9, 2008.
"Considerations on Buffer Status Reporting", 3GPP TSG RAN WG2 #62, R2-082216, May 5-9, 2008 Kansas City, US.
Ericsson: "SR triggering in relation to uplink grants" 3GPP Draft; R2-081468, 3RD Generation Partnership Project (3GPP), Mobile Competence Centre ; 650, Route Des Lucioles ; F-06921 Sophia-Antipolis Cedex; France, vol. RAN WG2, No. Shenzhen, China; 20080325, Mar. 25, 2008, XP050139212 [retrieved on Mar. 25, 2008] pp. 1-3, paragraph 1-4.
International search report and Written Opinion—PCT/US2009/043090, International Search Authority—European Patent Office—Sep. 29, 2009.

(Continued)

*Primary Examiner* — Patrick Edouard
*Assistant Examiner* — Julio Perez
(74) *Attorney, Agent, or Firm* — Nerrie M. Zohn

(57) ABSTRACT

Systems and methodologies are described that facilitate communicating a Buffer Status Report (BSR) from user equipment (UE) while reducing the employment of a RACH procedure. A BSR Prohibit time interval can be triggered by a receipt of uplink data to the UE. The BSR can be conveyed utilizing an uplink-shared channel (UL-SCH) if a Scheduling Request (SR) or a Semi-Persistent Scheduling (SPS) occurs within the duration of the BSR Prohibit time interval. The BSR can be communicated utilizing a RACH procedure if a SR or SPS occurs upon the expiration of the BSR Prohibit time interval.

32 Claims, 11 Drawing Sheets

OTHER PUBLICATIONS

Ntt Docomo et al: "Buffer Status Report and Scheduling Request triggers" 3GPP Draft; R2-074173, 3RD Generation Partnership Project (3GPP), Mobile Competence Centre ; 650, Route Des Lucioles ; F-06921 Sophia-Antipolis Cedex; France, vol. RAN WG2, No. Shanghai, China; 20071002, Oct. 2, 2007, XP050136797 [retrieved on Oct. 2, 2007] the whole document.

Qualcomm Europe: "BSR Triggers" 3GPP Draft; R2-080375, 3RD Generation Partnership Project (3GPP), Mobile Competence Centre ; 650, Route Des Lucioles ; F-06921 Sophia-Antipolis Cedex; France, vol. RAN WG2, No. Sevilla, Spain; 20080108, Jan. 8, 2008, XP050138229 [retrieved on Jan. 8, 2008] pp. 1-3, paragraphs 2,3. 1,5.4.4,5.4.5,4.

3rd Generation Partnership Project: "3rd Generation Partnership Project; Technical Specification Group Radio Access Network; Evolved Universal Terrestrial Radio Access (E-UTRA) Medium Access Control (MAC) protocol specification (Release 8); 3GPP TS 36.321 V8.5.0" 3GPP TS 36.321 V8.5.0 [Online] vol. 36.321, No. V8.5.0, Mar. 1, 2009, pp. 1-46, XP002555765 Internet Retrieved from the Internet: URL:http://www.3gpp.orq/ftp/Specs/html-inf 0/36321.htm> [retrieved on Oct. 21, 2009] Sections 5.1.1 to 5.1.6.

* cited by examiner

BSR PROHIBIT TIMER

CROSS-REFERENCE TO RELATED APPLICATIONS

This application claims the benefit of U.S. Provisional Patent application Ser. No. 61/051,264 entitled "BSR PROHIBIT TIMER" which was filed May 7, 2008. The entirety of the aforementioned application is herein incorporated by reference.

BACKGROUND

I. Field

The following description relates generally to wireless communications, and more particularly to conveying a Buffer Status Report (BSR) to report data size in the buffer in a wireless communications environment.

II. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, . . . ). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations.

Wireless communication systems oftentimes employ one or more base stations that provide a coverage area. A typical base station can transmit multiple data streams for broadcast, multicast and/or unicast services, wherein a data stream may be a stream of data that can be of independent reception interest to a mobile device. A mobile device within the coverage area of such base station can be employed to receive one, more than one, or all the data streams carried by the composite stream. Likewise, a mobile device can transmit data to the base station or another mobile device.

Traditionally, Buffer Status Report (BSR) can be communicated upon receipt of uplink (UL) data at the user equipment (UE). For example, when UL data arrives at a UE, the BSR can be triggered in which the BSR can be a Medium Access Control Packet Data Unit (MAC PDU) that reports the status of the buffer for the UE (e.g., data size of the buffer related to the UE). Based on the BSR, a base station, eNodeB, and the like can schedule uplink (UL) transmissions for the UE. The BSR is traditionally communicated from the UE using a Random Access Channel (RACH) procedure.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

According to related aspects, a method that facilitates communicating a Buffer Status Report (BSR). The method can include receiving a configuration related to a Semi-Persistent Scheduling (SPS). Further, the method can include detecting a Buffer Status Report (BSR) associated with a logical channel that is triggered. Moreover, the method can comprise evaluating whether an SPS transmission occurs within a BSR Prohibit time interval associated with the triggered BSR. The method can additionally include conveying a BSR through an uplink shared channel when the SPS transmission opportunity occurs based upon the evaluation.

Another aspect relates to a wireless communications apparatus. The wireless communications apparatus can include at least one processor configured to receive a configuration related to a Semi-Persistent Scheduling (SPS), detect a Buffer Status Report (BSR) associated with a logical channel that is triggered, evaluate whether an SPS transmission occurs within a BSR Prohibit time interval associated with the triggered BSR, and convey a BSR through an uplink shared channel when the SPS transmission opportunity occurs based upon the evaluation. Further, the wireless communications apparatus can include memory coupled to the at least one processor.

Yet another aspect relates to a wireless communications apparatus that enables communication of a Buffer Status Report (BSR). The wireless communications apparatus can include means for receiving a configuration related to a Semi-Persistent Scheduling (SPS). Additionally, the wireless communications apparatus can comprise means for detecting a Buffer Status Report (BSR) associated with a logical channel that is triggered. Further, the wireless communications apparatus can comprise means for evaluating whether an SPS transmission occurs within a BSR Prohibit time interval associated with the triggered BSR. Moreover, the wireless communications apparatus can comprise means for conveying a BSR through an uplink shared channel when the SPS transmission opportunity occurs based upon the evaluation.

Still another aspect relates to a computer program product comprising a computer-readable medium having stored thereon code for causing at least one computer to receive a configuration related to a Semi-Persistent Scheduling (SPS), detect a Buffer Status Report (BSR) associated with a logical channel that is triggered, evaluate whether an SPS transmission occurs within a BSR Prohibit time interval associated with the triggered BSR, and convey a BSR through an uplink shared channel when the SPS transmission opportunity occurs based upon the evaluation.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
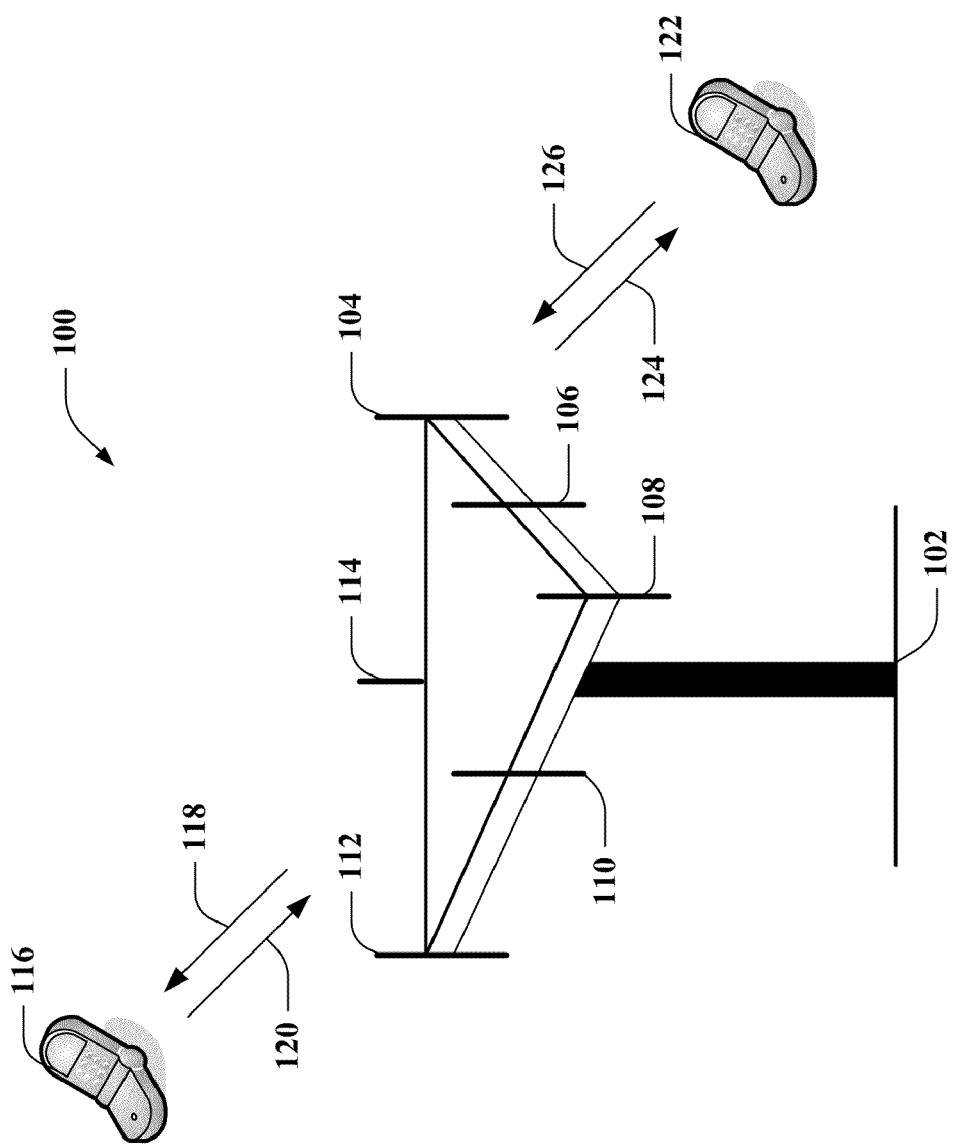
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "module," "component," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices.

Base station 102 (and/or each sector of base station 102) can employ one or more multiple access technologies (e.g., CDMA, TDMA, FDMA, OFDMA, . . . ). For instance, base station 102 can utilize a particular technology for communicating with mobile devices (e.g., mobile devices 116 and 122) upon a corresponding bandwidth. Moreover, if more than one technology is employed by base station 102, each technology can be associated with a respective bandwidth. The technologies described herein can include following: Global System for Mobile (GSM), General Packet Radio Service (GPRS), Enhanced Data Rates for GSM Evolution (EDGE), Universal Mobile Telecommunications System (UMTS), Wideband Code Division Multiple Access (W-CDMA), cdmaOne (IS-95), CDMA2000, Evolution-Data Optimized (EV-DO), Ultra Mobile Broadband (UMB), Worldwide Interoperability for Microwave Access (WiMAX), MediaFLO, Digital Multimedia Broadcasting (DMB), Digital Video Broadcasting-Handheld (DVB-H), etc. It is to be appreciated that the aforementioned listing of technologies is provided as an example and the claimed subject matter is not so limited; rather, substantially any wireless communication technology is intended to fall within the scope of the hereto appended claims.

Base station 102 can employ a first bandwidth with a first technology. Moreover, base station 102 can transmit a pilot corresponding to the first technology on a second bandwidth. According to an illustration, the second bandwidth can be leveraged by base station 102 and/or any disparate base station (not shown) for communication that utilizes any second technology. Moreover, the pilot can indicate the presence of the first technology (e.g., to a mobile device communicating via the second technology). For example, the pilot can use bit(s) to carry information about the presence of the first technology. Additionally, information such as a SectorID of the sector utilizing the first technology, a CarrierIndex indicating the first frequency bandwidth, and the like can be included in the pilot.

According to another example, the pilot can be a beacon (and/or a sequence of beacons). A beacon can be an OFDM symbol where a large fraction of the power is transmitted on one subcarrier or a few subcarriers (e.g., small number of subcarriers). Thus, the beacon provides a strong peak that can be observed by mobile devices, while interfering with data on a narrow portion of bandwidth (e.g., the remainder of the bandwidth can be unaffected by the beacon). Following this example, a first sector can communicate via CDMA on a first bandwidth and a second sector can communicate via OFDM on a second bandwidth. Accordingly, the first sector can signify the availability of CDMA on the first bandwidth (e.g., to mobile device(s) operating utilizing OFDM on the second bandwidth) by transmitting an OFDM beacon (or a sequence of OFDM beacons) upon the second bandwidth.

In general, the subject innovation can efficiently communicate a Buffer Status Report (BSR) in order to report a data buffer size for a user equipment (UE) by reducing the use of a Random Access Channel procedure for transmission. In general, the subject innovation can employ a Buffer Status Report (BSR) Prohibit time interval that can communicate the BSR utilizing a Scheduling Request (SR) or a Semi-Persistent Scheduling (SPS) communication that occurs during the BSR Prohibit time interval. If at least one of a SR or an SPS occurs during the interval, the BSR can be communicated on an uplink shared channel (UL-SCH) and the RACH procedure is not employed to communicate the BSR. Yet, if the SR or the SPS does not occur during the interval, the BSR can be communicated with the RACH procedure. By leveraging detecting of the SR and/or the SPS during the BSR Prohibit time interval, the implementation of the UL-SCH to communicate the BSR can reduce the employment of the RACH procedure.

Figure 2:
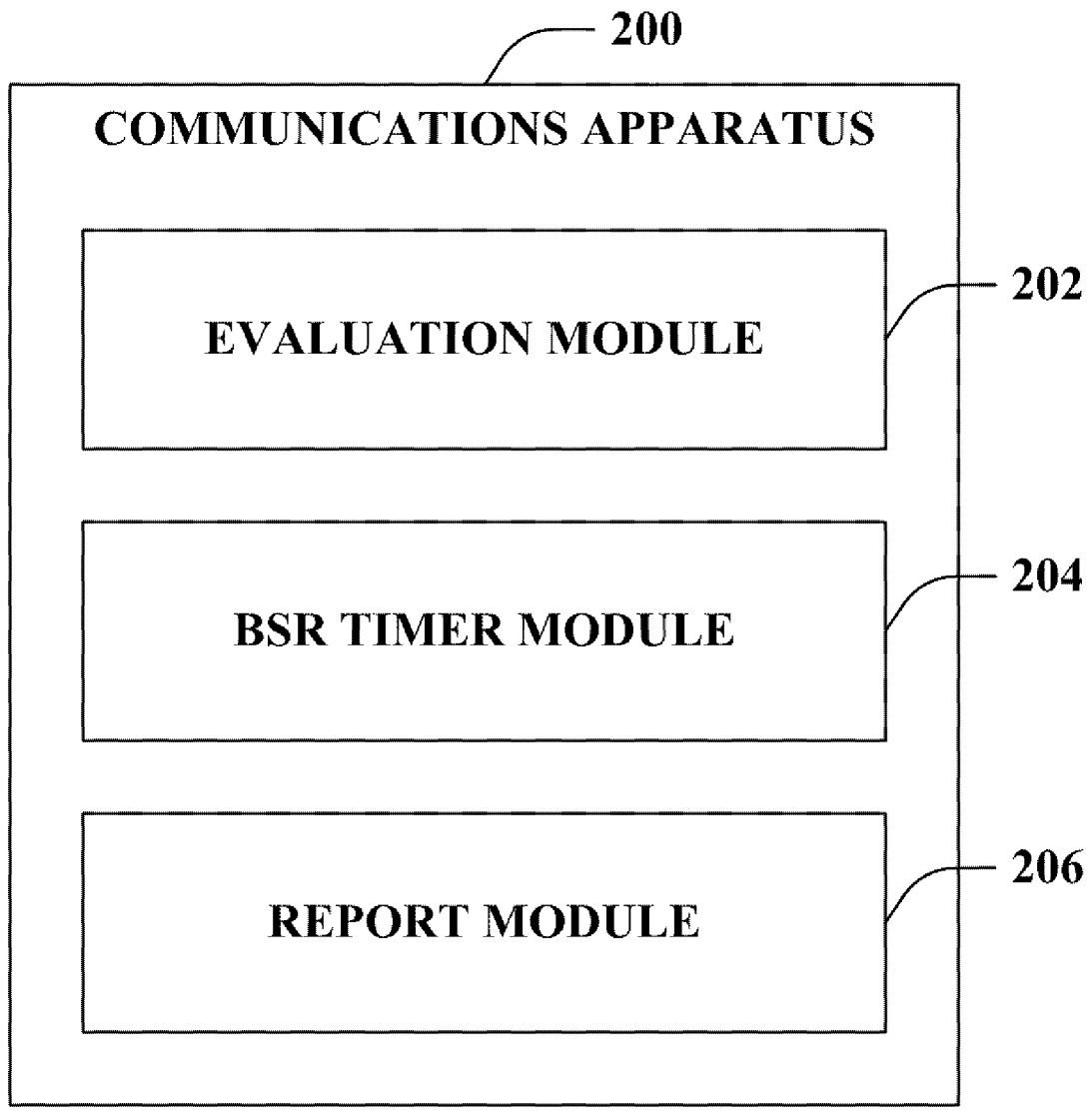
FIG. 2 is an illustration of an example communications apparatus for employment within a wireless communications environment.

Turning to FIG. 2, illustrated is a communications apparatus 200 for employment within a wireless communications environment. The communications apparatus 200 can be a base station or a portion thereof, a mobile device or a portion thereof, or substantially any communications apparatus that receives data transmitted in a wireless communications environment. In communications systems, the communications apparatus 200 employ components described below in order to effectively and optimally communicate a Buffer Status Report (BSR).

The communications apparatus 200 can include an evaluation module 202 that can identify a scheduling technique is employed such as, but not limited to, Scheduling Request (SR) or Semi-Persistent Scheduling (SPS). Moreover, the communications apparatus 200 can include a BSR timer module 204 that can manage a BSR Prohibit time interval, wherein such management can include starting a timer, stopping a timer, resetting a timer, and the like. In particular, the BSR timer module 204 can initiate a BSR Prohibit time interval based upon a triggering of a BSR, wherein such trigger can be, but is not limited to being, a receipt of uplink data at a user equipment. The communications apparatus 200 can further include a report module 206 that can detect communications related to at least one of a SR or an SPS. The report module 206 can determine whether or not the SR or the SPS is detected within the BSR Prohibit time interval as well as communicate the BSR based upon the determination. In general, if the SR or the SPS is detected within the interval, the BSR can be communicated via the UL-SCH in a UL-SCH report. If the SR or the SPS is detected after the interval is expired, the BSR can be communicated with a RACH procedure.

Moreover, although not shown, it is to be appreciated that communications apparatus 200 can include memory that retains instructions with respect to receiving a configuration related to a Semi-Persistent Scheduling (SPS), detecting a Buffer Status Report (BSR) associated with a logical channel that is triggered, evaluating whether an SPS transmission occurs within a BSR Prohibit time interval associated with the triggered BSR, conveying a BSR through an uplink shared channel when the SPS transmission opportunity occurs based upon the evaluation, receiving the BSR from the uplink shared channel, and the like. Further, communications apparatus 200 can include a processor that may be utilized in connection with executing instructions (e.g., instructions retained within memory, instructions obtained from a disparate source, . . . ).

Figure 3:
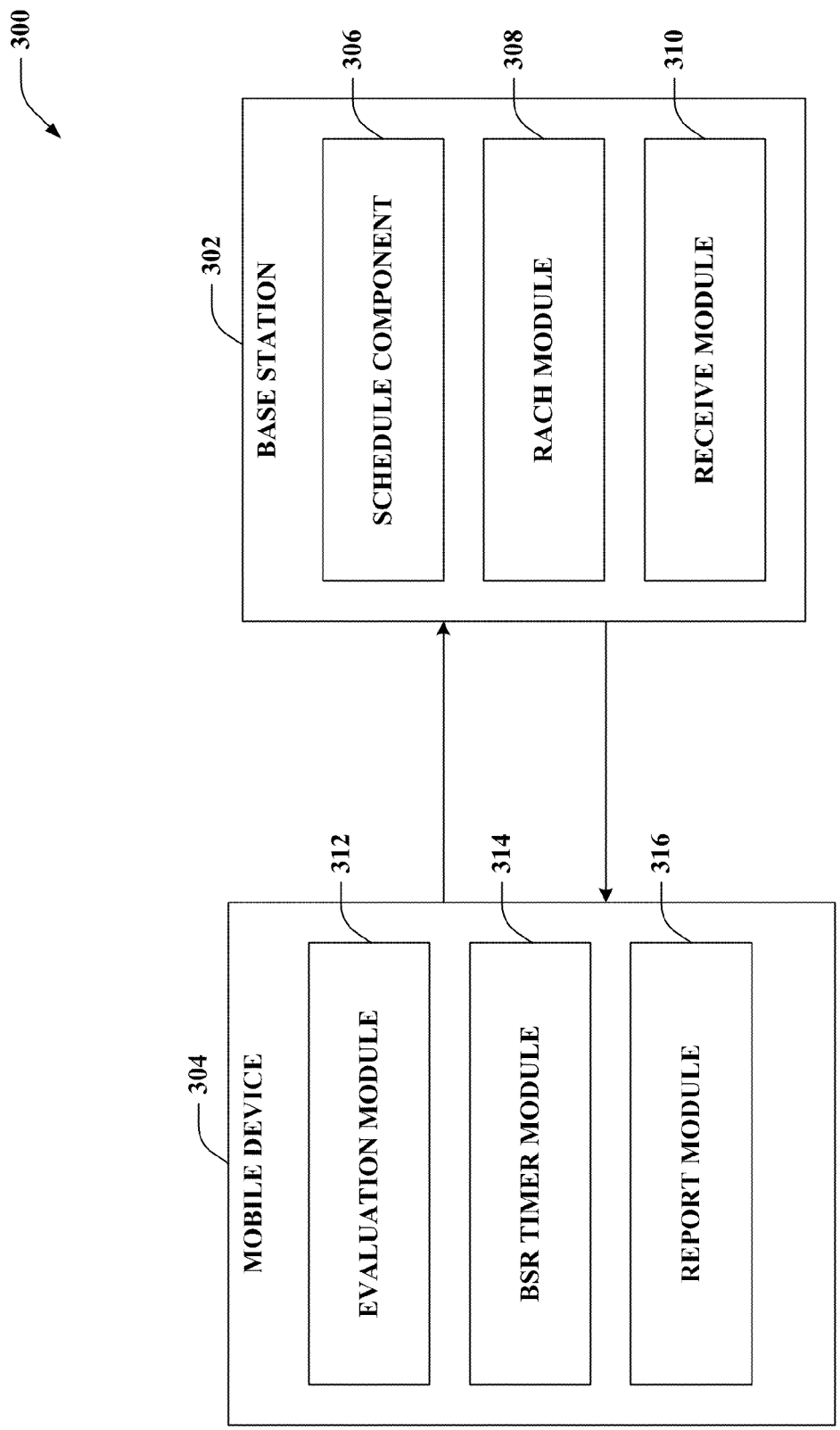
FIG. 3 is an illustration of an example wireless communications system that facilitates communicating a Buffer Status Report (BSR) in a manner that reduces Uplink (UL) load.

Now referring to FIG. 3, illustrated is a wireless communications system 300 that can communicate a Buffer Status Report (BSR) in a manner that reduces Uplink (UL) load. The system 300 includes a base station 302 that communicates with a mobile device 304 (and/or any number of disparate mobile devices (not shown)). Base station 302 can transmit information to mobile device 304 over a forward link channel; further base station 302 can receive information from mobile device 304 over a reverse link channel. Moreover, system 300 can be a MIMO system. Additionally, the system 300 can operate in an OFDMA wireless network, a 3GPP LTE wireless network, etc. Also, the components and functionalities shown and described below in the base station 302 can be present in the mobile device 304 as well and vice versa, in one example; the configuration depicted excludes these components for ease of explanation.

Base station 302 includes a schedule component 306 that can employ scheduling techniques such as, but not limited to, Scheduling Request (SR), Semi-Persistent Scheduling (SPS), etc. The base station 302 can further include a RACH module 308. The RACH module 308 can implement a Random Access Channel procedure. Moreover, the base station 302 can include a receive module 310 that can receive a communicated BSR from the mobile device 304.

Mobile device 304 can include an evaluation module 312 that can identify a scheduling technique implemented by the base station 302. For example, the evaluation module 312 can identify a configuration of at least one of a SR or an SPS. The mobile device 304 can further include a BSR timer module 314 that can employ a BSR Prohibit time interval in which communication of the BSR is managed. The BSR timer module 314 can identify at least one of a SR or an SPS that occurs or is received during the BSR Prohibit time interval, wherein an uplink shared channel (UL-SCH) is utilized to communicate or convey the BSR. Based upon such identification, the report module 316 can communicate the BSR to the base station 302. For example, if the SR or the SPS is detected during the BSR Prohibit time interval, the report module 316 can communicate the BSR utilizing the UL-SCH with a UL-SCH report. Yet, if the SR or the SPS does not occur prior to the expiration of the BSR Prohibit time interval, the report module 316 can communicate the BSR utilizing a RACH procedure.

Moreover, although not shown, it is to be appreciated that mobile device 304 can include memory that retains instructions with respect to receiving a configuration related to a Semi-Persistent Scheduling (SPS), detecting a Buffer Status Report (BSR) associated with a logical channel that is triggered, evaluating whether an SPS transmission occurs within a BSR Prohibit time interval associated with the triggered BSR, conveying a BSR through an uplink shared channel when the SPS transmission opportunity occurs based upon the evaluation, and the like. Further, communications apparatus 200 can include a processor that may be utilized in connection with executing instructions (e.g., instructions retained within memory, instructions obtained from a disparate source, . . . ).

Figure 4:
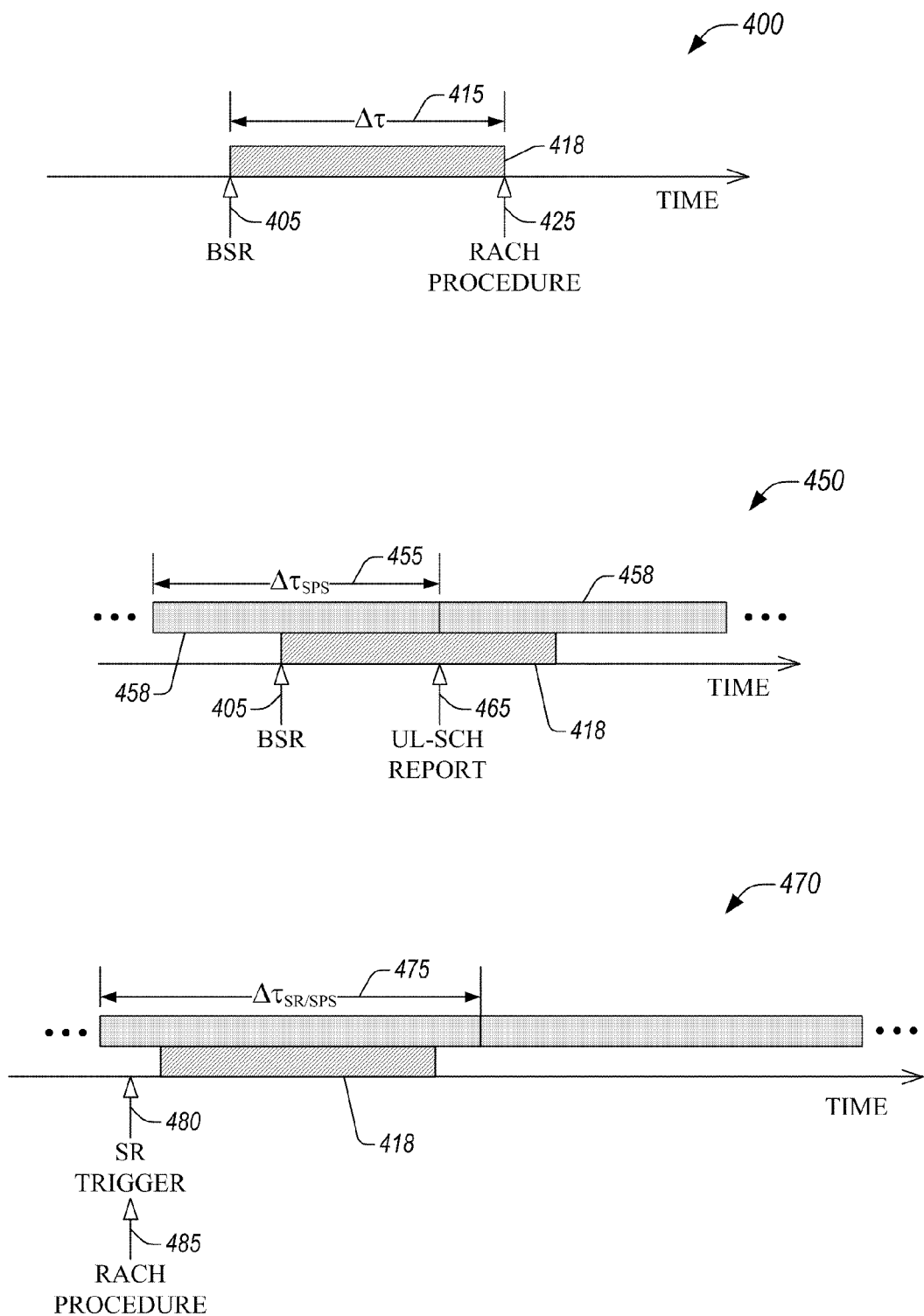
FIG. 4 is an illustration of diagrams that enable optimized communication of a Buffer Status Report (BSR) while mitigating use of a Random Access Channel (RACH) procedure.

Now referring to FIG. 4, diagrams that enable optimized communication of a Buffer Status Report (BSR) while mitigating use of a RACH procedure within a wireless communications system are illustrated according to one or more aspects of the subject disclosure. In LTE, when UL data arrives in a user equipment (UE), a BSR is triggered; a BSR typically is a Medium Access Control Packet Data Unit (MAC PDU) that conveys a report of the UE buffer status, e.g., data size in the buffer. When a Scheduling Request (SR) is not configured, the UE will perform the Random Access Channel (RACH) procedures to send the BSR. The information in the BSR is used by an eNode B to schedule the UE for Uplink (UL) transmission.

Additionally, when SPS is configured by an eNode B serving the UE, the eNode assigns when the UE is allowed to transmit a new UL HARQ transmission every time interval $\Delta\tau_{SPS}$. For example, $\Delta\tau_{SPS}=20$ ms indicates that the UE can transmit a new UL-HARQ transmission of sub-frame 1, 20, 40, 60, and so forth. It is to be noted that even in a case when SPS is configured, if the BSR is triggered between two UL Semi-Persistent Scheduling (SPS) transmission opportunities (e.g., within the time span $\Delta\tau_{SPS}$), UE will send the BSR using RACH procedures, as opposed to wait for the next SPS transmission opportunity to send the BSR. Therefore, unnecessary RACH procedures may take place.

Furthermore, for voice over IP (VoIP) type sources (with talk spurt) added overhead can result from reception by a scheduler of BSR every $\Delta\tau_{SPS}$ (e.g., $\Delta\tau_{SPS}=20$ ms, in which case it can add 2 or 4 bytes to each MAC PDU). Conventionally, such overhead is typically incurred when only VoIP flow is present. It should also be appreciated that sources that create talk spurts can be given SR, otherwise such sources can warrant RACH procedure(s) at the beginning of each talk spurt, which can increase RACH load substantially.

Further yet, for video type sources, which typically present traffic (e.g., conveyed with constant bitrate) for as long as a video application executes, SPS can remain operative (e.g., in an ON state) and thus SR may not be configured. Yet, a video source typically will fail to be synchronized with the SPS interval, hence every time a new packet arrives, BSR will be triggered, and a RACH procedure will be started. The latter can also increase RACH load and it is therefore undesirable.

In an aspect of the subject innovation, efficient UL signaling of BSR is provided, based at least in part on semi-persistent scheduling. More particularly, to mitigate RACH procedure overhead, each logical channel in a set of logical channels has a BSR Prohibit time interval in which the UE waits prior to a RACH procedure occurs after a BSR is triggered; such a trigger starts the BSR Prohibit timer. When BSR timer is running at a time a need to send a BSR is detected, the timer continues run.

FIG. 4 includes a diagram 400 that illustrates aspects discussed herein. A triggered BSR 405 for a logical channel and its associated BSR Prohibit interval $\Delta\tau$ 415, which sets a timer represented with block 418, are illustrated. A RACH procedure 425 is conducted at the end of BSR Prohibit timer 418 to convey the BSR.

FIG. 4 further includes a diagram 450 that illustrates techniques to convey a BSR when SPS is operative, or implemented. In an illustrated aspect, SPS presents transmission opportunities at $\Delta\tau_{SPS}$ time intervals 455, whose time span is illustrated with block 458. After BSR is detected and triggered (BSR 405), if the next SPS transmission opportunity arises within the BSR Prohibit timer, the BSR is conveyed on the UL-SCH, as a UL-SCH report 465, as opposed to be on the RACH. Therefore, overhead associated with RACH procedures are mitigated. It should be appreciated that overhead mitigation is effected through a delay to convey the BSR.

The BSR Prohibit time interval provides a scheme that can be generalized where SR and SPS are considered substantially same. It is to be noted that Scheduling Request is a physical channel that can optionally be assigned to UE with binary phase shift keying (BPSK) modulation, indicating a request/need of an uplink grant to send BSR, or the lack of such a need/request.

FIG. 4 further facilitates to illustrate such scheme through diagram 470. When assessing whether to conduct a RACH procedure given that SR is triggered at instant 480, a UE can check, or evaluate, if either SR or SPS opportunity, dictated by a time interval $\Delta\tau_{SR/SPS}$ 475, will be available in the next BSR Prohibit interval 418 (e.g., BSR Prohibit timer 418). When no SR or SPS is available within the BSR Prohibit timer 418, RACH is used at 485; conversely, UE waits until the SR/SPS transmission opportunity and conveys the SR through UL-SCH or other suitable communication means.

It should be appreciated that, when configured, SPS applies to the whole UE and SPS transmissions are utilized for RRC messages also. Since delaying RRC messages by waiting for the next SPS transmission opportunity (e.g., dictated by time interval 455) is not desirable, the BSR Prohibit interval (e.g., $\Delta\tau$ 415) of a logical channel associated with a signaling radio bearer (SRB), which maps one-to-one to a logical channel, could be set to a shorter time span $\Delta\tau_{SHORT}$ (e.g., 5 ms) when compared to $\Delta\tau_{SPS}$, or $\Delta\tau_{SR/SPS}$. In this manner, substantially any BSR from a SRB, or a data/traffic radio bearer (DRB/TRB), can trigger a RACH procedure when the next SPS transmission opportunity occurs at an instant later than $\Delta\tau_{SHORT}$ (e.g., 5 ms) in the future.

It should be appreciated that a BSR Prohibit timer (e.g., $\Delta\tau$ 415) provides efficient processing overhead mitigation when SPS is configured. It should be further appreciated that by assigning different logical channels different BSR Prohibit intervals, different QoS (quality of service) can be provided while minimizing RACH procedure(s) overhead when SPS is utilized, or implemented. The BSR Prohibit interval could be defined per terminal, per radio bearer, or per group of radio bearers (e.g., a group of RBs that aggregate their buffer to report in a single BSR). In an aspect, up to 4 new timers in MAC can be introduced as a tradeoff between BSR Prohibit timer and a RB group.

Assignment of BSR Prohibit timer and various time intervals, such as SR/SPS time interval, can be configured by a wireless network management component, module, or agent, through a processor that facilitates configuration. Configuration parameters, which include magnitude of BSR timers and other time intervals, can be stored in a memory in a UE that exploits mitigation of processing overhead via BSR Prohibit timer(s) when operating in SPS. Alternative, substantially any interval described herein can be stored in substantially any memory in any network component, or module, and conveyed through communication means to a UE for implementation of the various aspects described herein. Additionally, implementation of RACH procedures and other communication procedures can be implemented through one or more components or modules configured to such ends. The component(s), or module(s), also provide substantially any functionality to initiate and retain a communication in a wireless network.

Figure 5:
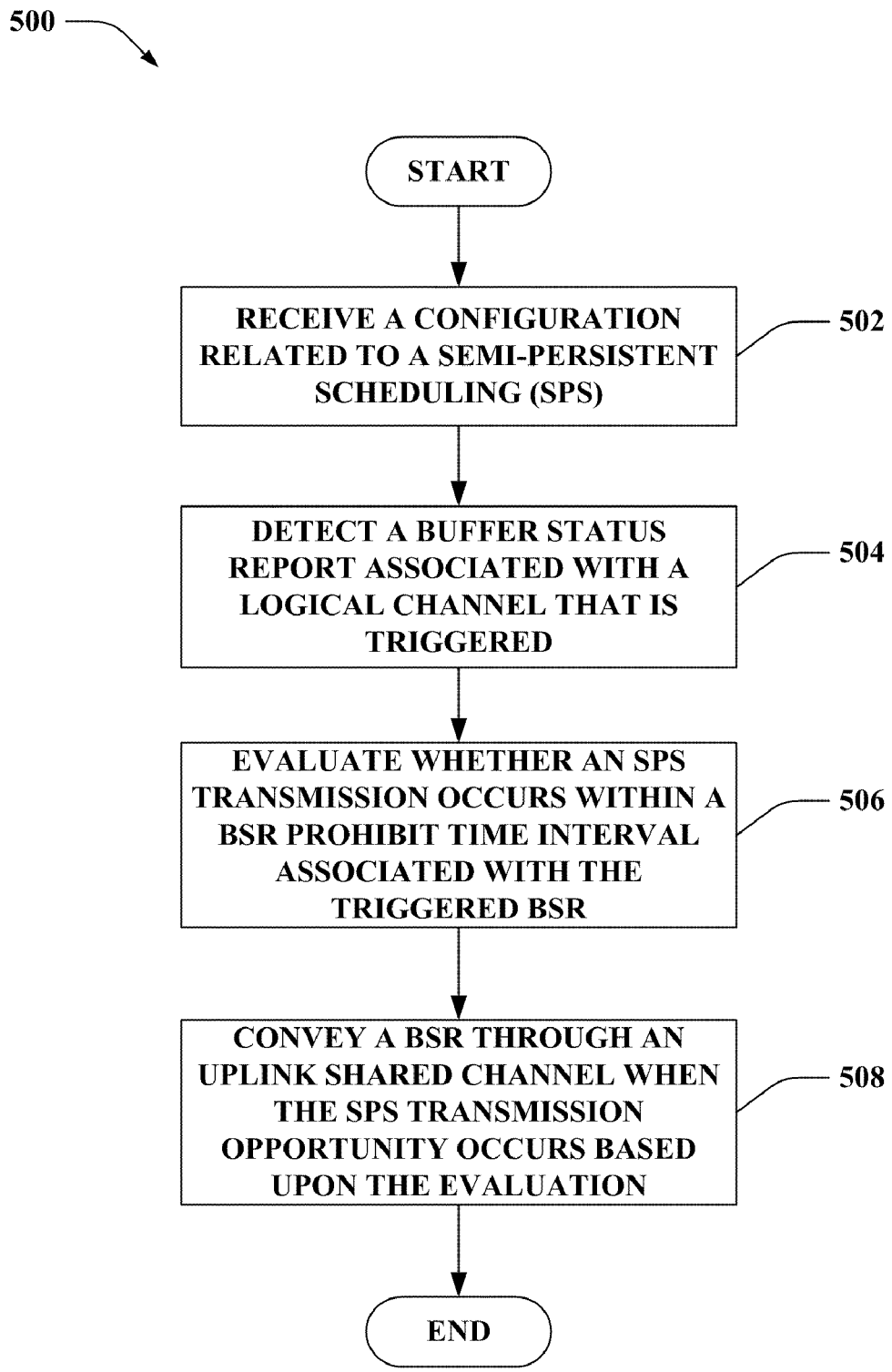
FIG. 5 is an illustration of an example methodology that transmits a Buffer Status Report (BSR) based upon a BSR Prohibit time interval.
Figure 6:
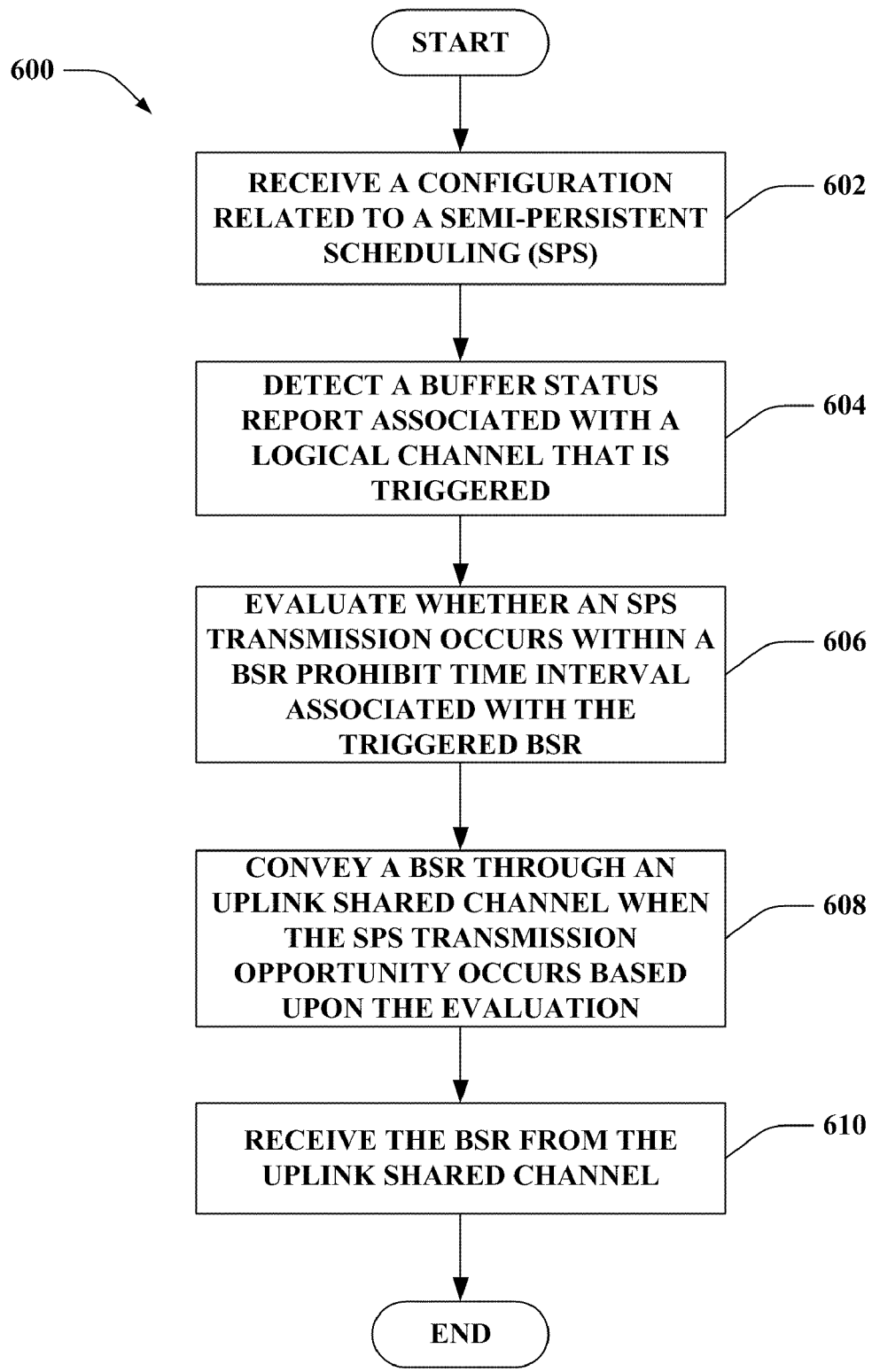
FIG. 6 is an illustration of an example methodology that receives a Buffer Status Report (BSR) based upon a BSR Prohibit time interval.

Referring to FIGS. 5-6, methodologies relating to providing uplink timing control while reducing overhead and power consumption are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 5, illustrated is a methodology 500 that facilitates transmitting a Buffer Status Report (BSR) based upon a BSR Prohibit time interval. At reference numeral 502, a configuration related to a Semi-Persistent Scheduling (SPS) can be received. At reference numeral 504, a Buffer Status Report (BSR) associated with a logical channel that is triggered can be detected. At reference numeral 506, an SPS transmission can be evaluated to identify whether the transmission occurs within a BSR Prohibit time interval associated with the triggered BSR. At reference numeral 508, a BSR can be conveyed through an uplink shared channel when the SPS transmission opportunity occurs based upon the evaluation.

Now referring to FIG. 6, a methodology 600 that facilitates receiving a Buffer Status Report (BSR) based upon a BSR Prohibit time interval. At reference numeral 602, a configuration related to a Semi-Persistent Scheduling (SPS) can be received. At reference numeral 604, a Buffer Status Report (BSR) associated with a logical channel that is triggered can be detected. At reference numeral 606, an SPS transmission can be evaluated to identify whether the transmission occurs within a BSR Prohibit time interval associated with the triggered BSR. At reference numeral 608, a BSR can be conveyed through an uplink shared channel when the SPS transmission opportunity occurs based upon the evaluation. At reference numeral 610, the BSR can be received from the uplink shared channel.

Figure 7:
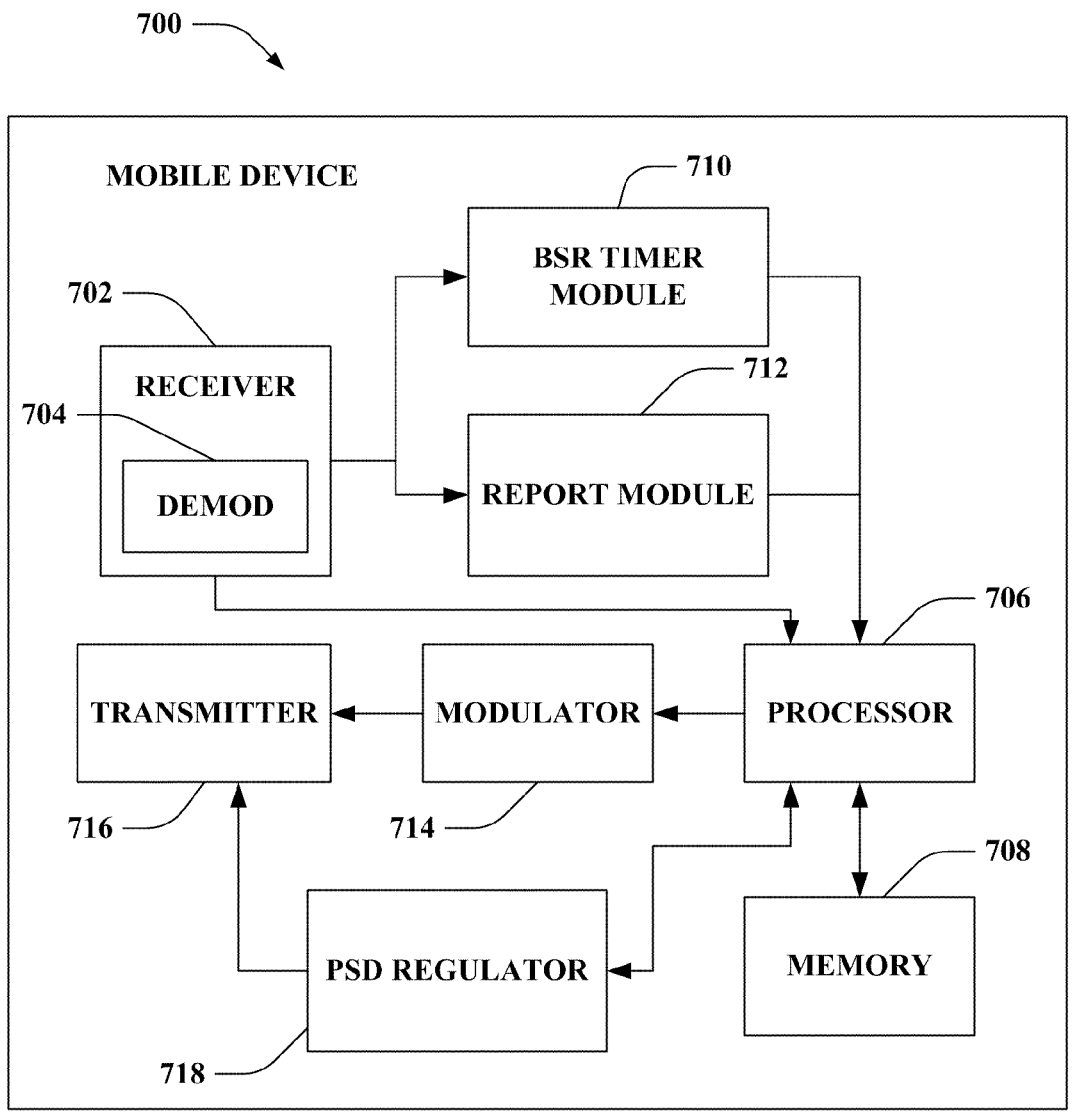
FIG. 7 is an illustration of an example mobile device that facilitates communicating a Buffer Status Report (BSR) utilizing a Scheduling Request (SR) or a Semi-Persistent Scheduling (SPS) in a wireless communication system.

FIG. 7 is an illustration of a mobile device 700 that facilitates communicating a Buffer Status Report (BSR) utilizing a Scheduling Request (SR) or a Semi-Persistent Scheduling (SPS) in a wireless communication system. Mobile device 700 comprises a receiver 702 that receives a signal from, for instance, a receive antenna (not shown), performs typical actions on (e.g., filters, amplifies, downconverts, etc.) the received signal, and digitizes the conditioned signal to obtain samples. Receiver 702 can comprise a demodulator 704 that can demodulate received symbols and provide them to a processor 706 for channel estimation. Processor 706 can be a processor dedicated to analyzing information received by receiver 702 and/or generating information for transmission by a transmitter 716, a processor that controls one or more components of mobile device 700, and/or a processor that both analyzes information received by receiver 702, generates information for transmission by transmitter 716, and controls one or more components of mobile device 700.

Mobile device 700 can additionally comprise memory 708 that is operatively coupled to processor 706 and that can store data to be transmitted, received data, information related to available channels, data associated with analyzed signal and/or interference strength, information related to an assigned channel, power, rate, or the like, and any other suitable information for estimating a channel and communicating via the channel. Memory 708 can additionally store protocols and/or algorithms associated with estimating and/or utilizing a channel (e.g., performance based, capacity based, etc.).

It will be appreciated that the data store (e.g., memory 708) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 708 of the subject systems and methods is intended to comprise, without being limited to, these and any other suitable types of memory.

Processor 706 can further be operatively coupled to at least one of a BSR timer module 710 or a report module 712. The BSR timer module 710 can evaluate whether a SR or SPS is configured as described above. Moreover, the BSR timer module 710 can manage a BSR Prohibit time interval that can be triggered by a receipt of uplink data. During the BSR Prohibit time interval, the BSR timer module can identify whether a SR or an SPS occurs. Based on such identification, the report module 712 can package and communicate the BSR accordingly. In particular, if the SR or the SPS occurs during the BSR Prohibit time interval, the report module 712 can communicate the BSR utilizing a UL-SCH with a UL-SCH report. Yet, if the SR or the SPS occurs after the expiration of the BSR Prohibit time interval, the report module 712 can communicate or convey the BSR with a RACH procedure.

Mobile device 700 still further comprises a modulator 714 and transmitter 716 that respectively modulate and transmit signals to, for instance, a base station, another mobile device, etc. Although depicted as being separate from the processor 706, it is to be appreciated that the BSR timer module 710, report module 712, demodulator 704, and/or modulator 714 can be part of the processor 706 or multiple processors (not shown).

Figure 8:
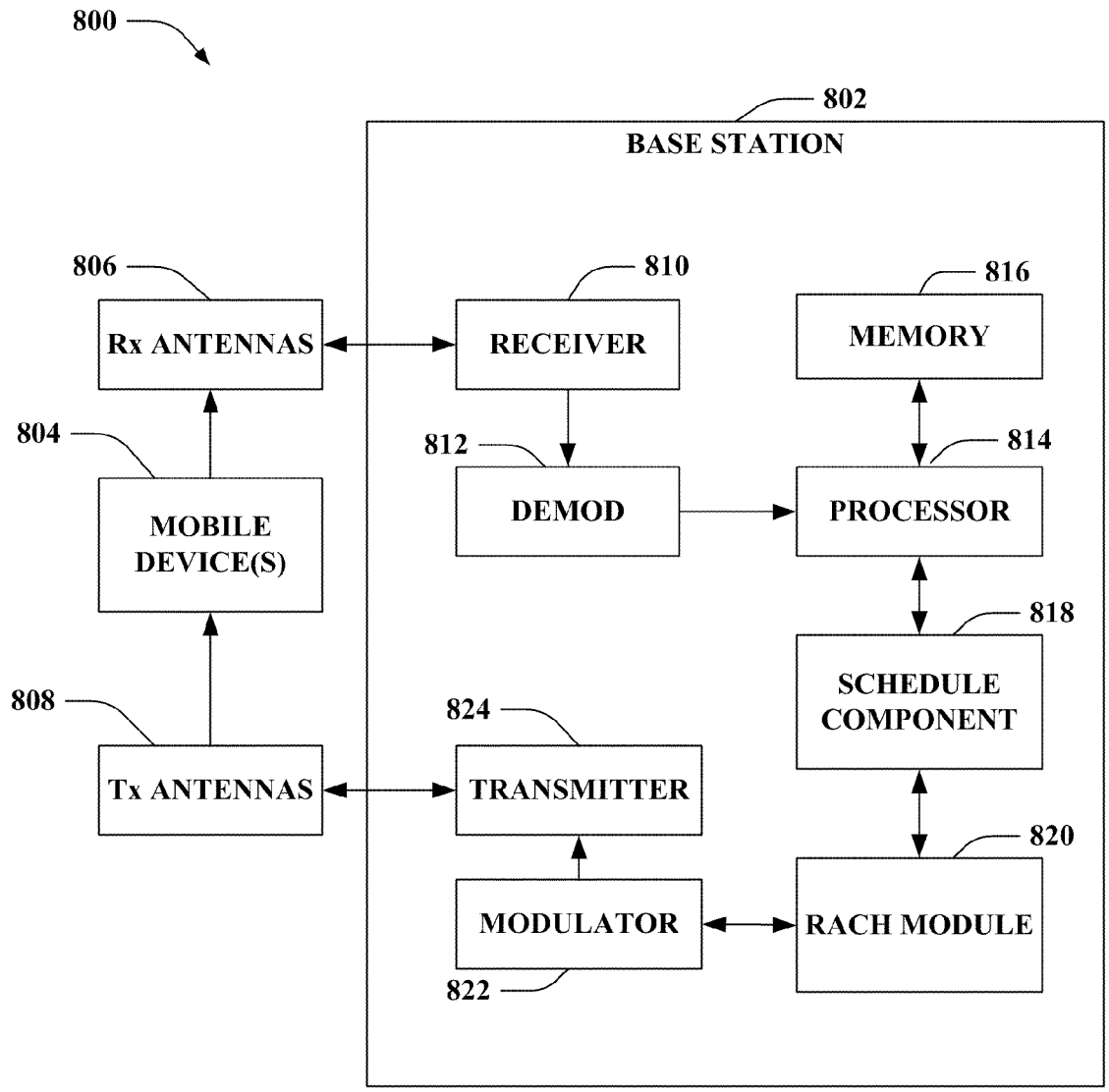
FIG. 8 is an illustration of an example system that facilitates communicating a Buffer Status Report (BSR) in a manner that reduces Uplink (UL) load in a wireless communication environment.

FIG. 8 is an illustration of a system 800 that facilitates communicating a Buffer Status Report (BSR) in a manner that reduces Uplink (UL) load in a wireless communication environment as described supra. The system 800 comprises a base station 802 (e.g., access point, . . . ) with a receiver 810 that receives signal(s) from one or more mobile devices 804 through a plurality of receive antennas 806, and a transmitter 824 that transmits to the one or more mobile devices 804 through a transmit antenna 808. Receiver 810 can receive information from receive antennas 806 and is operatively associated with a demodulator 812 that demodulates received information. Demodulated symbols are analyzed by a processor 814 that can be similar to the processor described above with regard to FIG. 7, and which is coupled to a memory 816 that stores information related to estimating a signal (e.g., pilot) strength and/or interference strength, data to be transmitted to or received from mobile device(s) 804 (or a disparate base station (not shown)), and/or any other suitable information related to performing the various actions and functions set forth herein. Processor 814 is further coupled to a timing adjustment determiner 818 that can ascertain if mobile devices 804 require timing updates. Moreover, the processor 814 can be coupled to a timing adjustment evaluator 820 that can generate timing adjustment commands that update timing of mobile device 804 according to the identified need.

Moreover, the processor 814 can be coupled to at least one of a schedule component 818 or a RACH module 820. The schedule component 818 can employ any suitable scheduling technique such as, but not limited to, a Scheduling Request (SR) or a Semi-Persistent Scheduling (SPS). In addition, the RACH module 820 can implement a RACH procedure. It is to be appreciated that the schedule component 818 and/or the RACH module 820 can be utilized to receive the BSR from a user equipment (UE) or mobile device(s) 804 in accordance with the subject innovation.

Furthermore, although depicted as being separate from the processor 814, it is to be appreciated that the schedule component 818, RACH module 820, demodulator 812, and/or modulator 822 can be part of the processor 814 or multiple processors (not shown).

Figure 9:
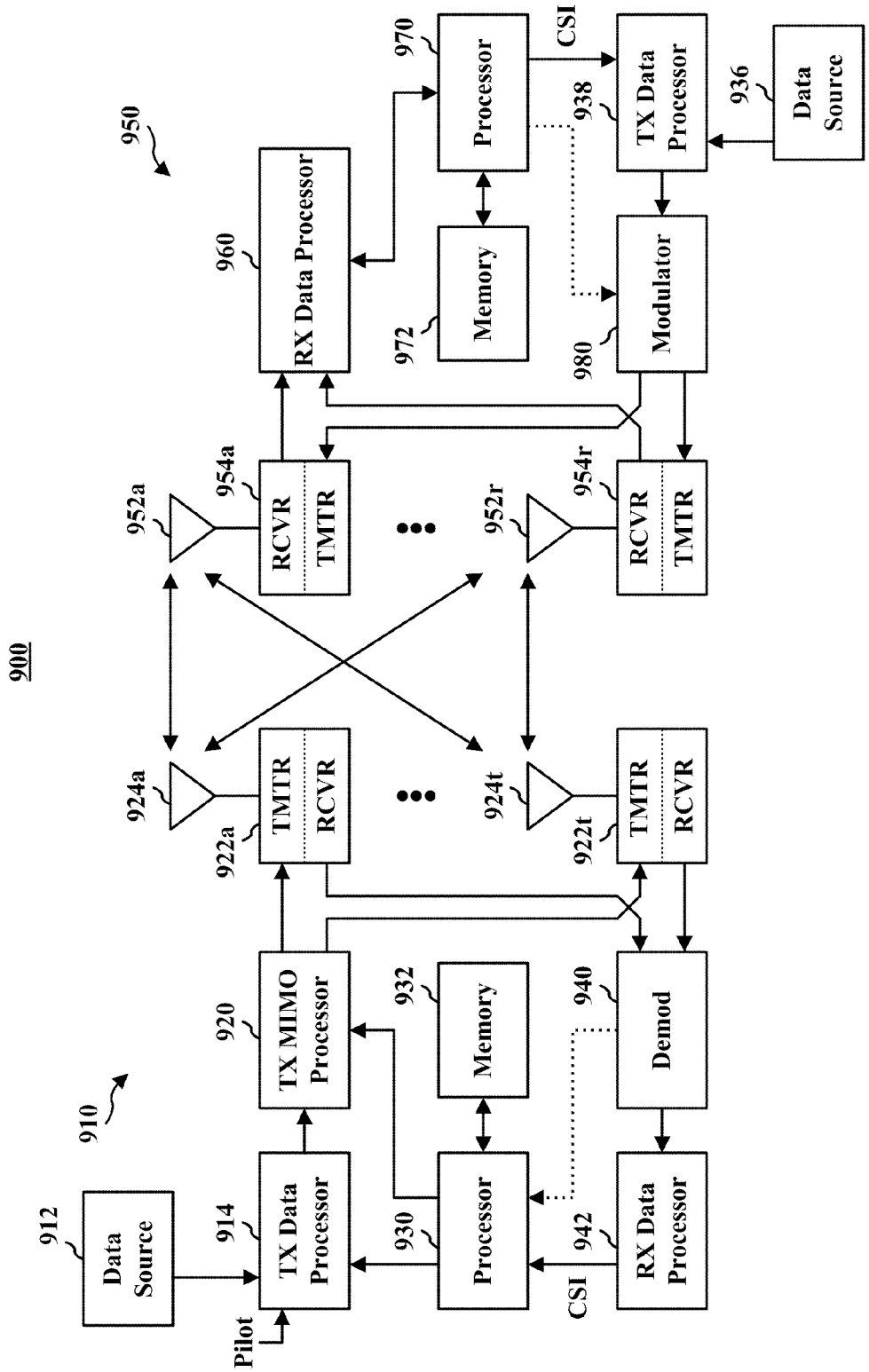
FIG. 9 is an illustration of an example wireless network environment that can be employed in conjunction with the various systems and methods described herein.

FIG. 9 shows an example wireless communication system 900. The wireless communication system 900 depicts one base station 910 and one mobile device 950 for sake of brevity. However, it is to be appreciated that system 900 can include more than one base station and/or more than one mobile device, wherein additional base stations and/or mobile devices can be substantially similar or different from example base station 910 and mobile device 950 described below. In addition, it is to be appreciated that base station 910 and/or mobile device 950 can employ the systems (FIGS. 1-3 and 7-8), techniques/configurations (FIG. 4) and/or methods (FIGS. 5-6) described herein to facilitate wireless communication there between.

At base station 910, traffic data for a number of data streams is provided from a data source 912 to a transmit (TX) data processor 914. According to an example, each data stream can be transmitted over a respective antenna. TX data processor 914 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 950 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 930.

The modulation symbols for the data streams can be provided to a TX MIMO processor 920, which can further process the modulation symbols (e.g., for OFDM). TX MIMO processor 920 then provides $N_T$ modulation symbol streams to $N_T$ transmitters (TMTR) 922a through 922t. In various embodiments, TX MIMO processor 920 applies beamforming weights to the symbols of the data streams and to the antenna from which the symbol is being transmitted.

Each transmitter 922 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 922a through 922t are transmitted from $N_T$ antennas 924a through 924t, respectively.

At mobile device 950, the transmitted modulated signals are received by $N_R$ antennas 952a through 952r and the received signal from each antenna 952 is provided to a respective receiver (RCVR) 954a through 954r. Each receiver 954 conditions (e.g., filters, amplifies, and downconverts) a respective signal, digitizes the conditioned signal to provide samples, and further processes the samples to provide a corresponding "received" symbol stream.

An RX data processor 960 can receive and process the $N_R$ received symbol streams from $N_R$ receivers 954 based on a particular receiver processing technique to provide $N_T$ "detected" symbol streams. RX data processor 960 can demodulate, deinterleave, and decode each detected symbol stream to recover the traffic data for the data stream. The processing by RX data processor 960 is complementary to that performed by TX MIMO processor 920 and TX data processor 914 at base station 910.

A processor 970 can periodically determine which precoding matrix to utilize as discussed above. Further, processor 970 can formulate a reverse link message comprising a matrix index portion and a rank value portion.

The reverse link message can comprise various types of information regarding the communication link and/or the received data stream. The reverse link message can be processed by a TX data processor 938, which also receives traffic data for a number of data streams from a data source 936, modulated by a modulator 980, conditioned by transmitters 954a through 954r, and transmitted back to base station 910.

At base station 910, the modulated signals from mobile device 950 are received by antennas 924, conditioned by receivers 922, demodulated by a demodulator 940, and processed by a RX data processor 942 to extract the reverse link message transmitted by mobile device 950. Further, processor 930 can process the extracted message to determine which precoding matrix to use for determining the beamforming weights.

Processors 930 and 970 can direct (e.g., control, coordinate, manage, etc.) operation at base station 910 and mobile device 950, respectively. Respective processors 930 and 970 can be associated with memory 932 and 972 that store program codes and data. Processors 930 and 970 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 10:
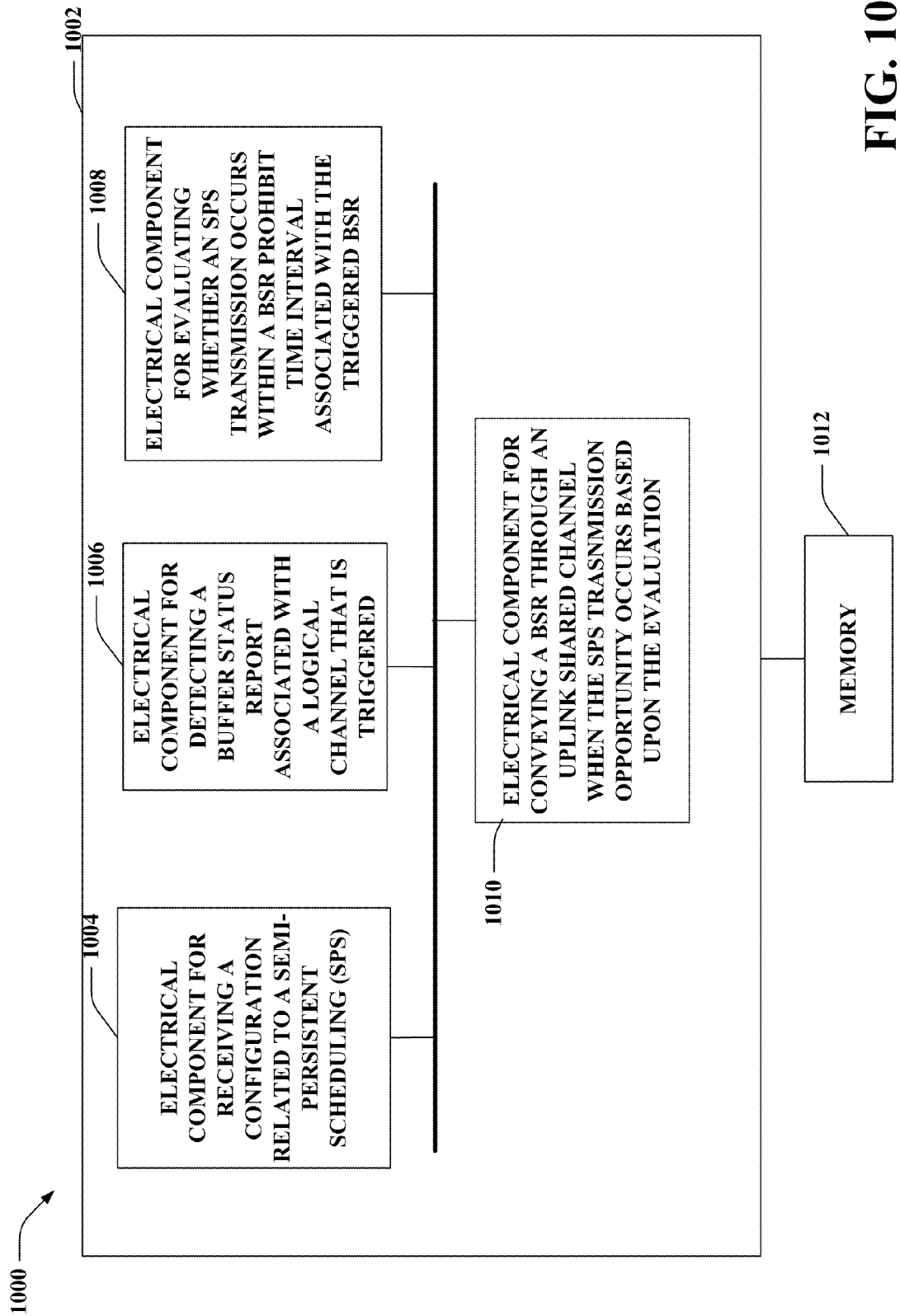
FIG. 10 is an illustration of an example system that facilitates transmitting a Buffer Status Report (BSR) based upon a BSR Prohibit time interval.

With reference to FIG. 10, illustrated is a system 1000 that transmits a Buffer Status Report (BSR) based upon a BSR Prohibit time interval. For example, system 1000 can reside at least partially within a base station, mobile device, etc. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. The logical grouping 1002 can include an electrical component for receiving a configuration related to a Semi-Persistent Scheduling (SPS) 1004. In addition, the logical grouping 1002 can comprise an electrical component for detecting a Buffer Status Report (BSR) associated with a logical channel that is triggered 1006. Moreover, the logical grouping 1002 can include an electrical component for evaluating whether an SPS transmission occurs within a BSR Prohibit time interval associated with the triggered BSR 1008. In addition, the logical grouping 1002 can comprise an electrical component for conveying a BSR through an uplink shared channel when the SPS transmission opportunity occurs based upon the evaluation 1010. Additionally, system 1000 can include a memory 1012 that retains instructions for executing functions associated with electrical components 1004, 1006, 1008, and 1010. While shown as being external to memory 1012, it is to be understood that one or more of electrical components 1004, 1006, 1008, and 1010 can exist within memory 1012.

Figure 11:
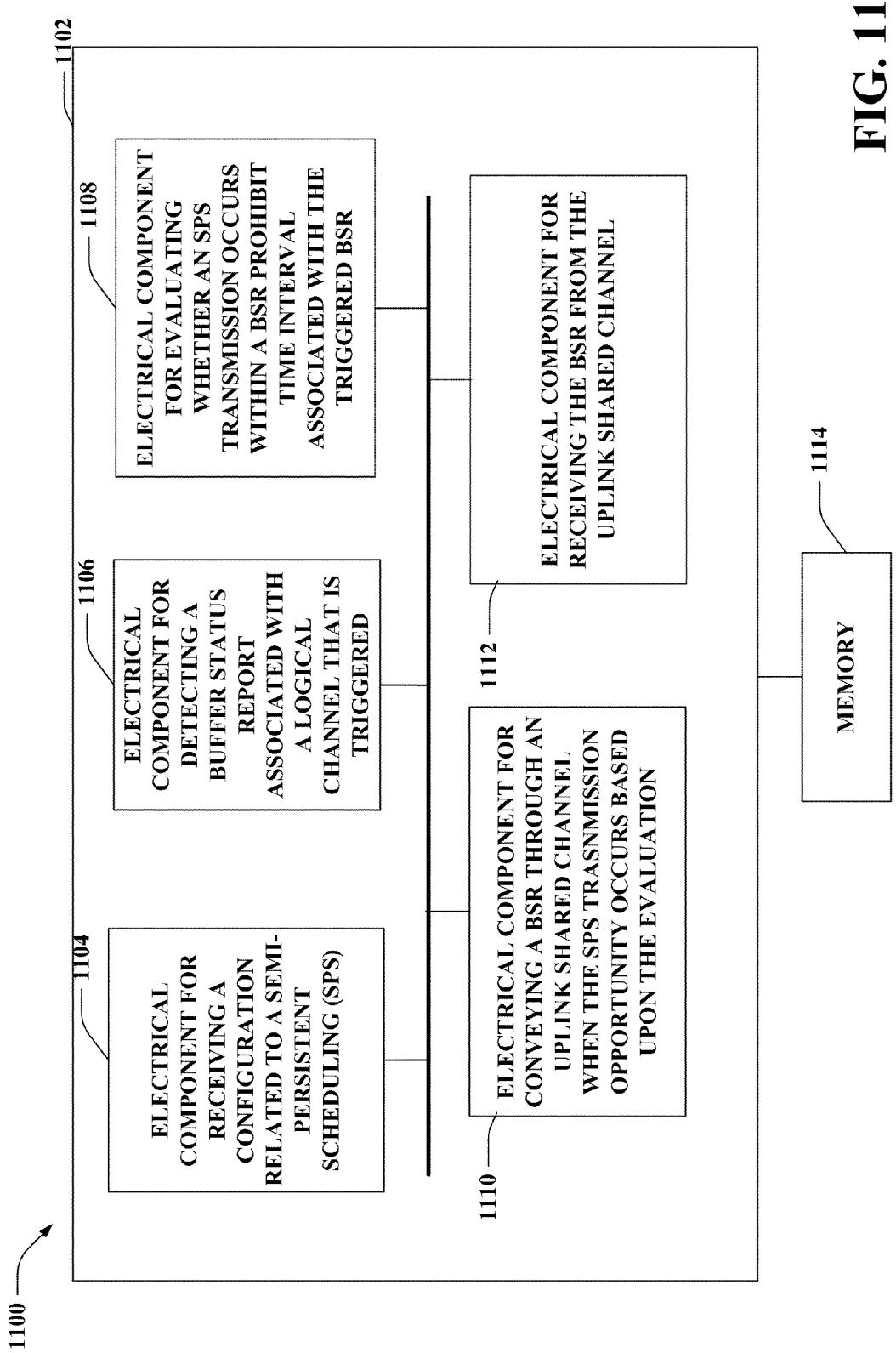
FIG. 11 is an illustration of an example system that receives a Buffer Status Report (BSR) based upon a BSR Prohibit time interval in a wireless communication environment.

Turning to FIG. 11, illustrated is a system 1100 that receives a Buffer Status Report (BSR) based upon a BSR Prohibit time interval. System 1100 can reside within a base station, mobile device, etc., for instance. As depicted, system 1100 includes functional blocks that can represent functions implemented by a processor, software, or combination thereof (e.g., firmware). System 1100 includes a logical grouping 1102 of electrical components that facilitate evaluating timing adjustments. Logical grouping 1102 can include an electrical component for receiving a configuration related to a Semi-Persistent Scheduling (SPS) 1104. Moreover, logical grouping 1102 can include an electrical component for detecting a Buffer Status Report (BSR) associated with a logical channel that is triggered 1106. Further, logical grouping 1102 can comprise an electrical component for evaluating whether an SPS transmission occurs within a BSR Prohibit time interval associated with the triggered BSR 1108. In addition, logical grouping 1102 can include an electrical component for conveying a BSR through an uplink shared channel when the SPS transmission opportunity occurs based upon the evaluation 1110. Further, logical grouping 1102 can comprise an electrical component for receiving the BSR from the uplink shared channel 1112. Additionally, system 1100 can include a memory 1114 that retains instructions for executing functions associated with electrical components 1104, 1106, 1108, 1110, and 1112. While shown as being external to memory 1114, it is to be understood that electrical components 1104, 1106, 1108, 1110, and 1112 can exist within memory 1114.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method used in a wireless communications system that facilitates communicating a Buffer Status Report (BSR), comprising:
   receiving a configuration related to a Semi-Persistent Scheduling (SPS);
   detecting the Buffer Status Report (BSR) associated with a logical channel that is triggered;
   evaluating whether an SPS transmission occurs within a BSR Prohibit time interval associated with the triggered BSR;
   conveying the BSR through an uplink shared channel when the SPS transmission opportunity occurs based upon the evaluation;
   detecting a Scheduling Request (SR) transmission that is triggered; and
   performing a random access channel (RACH) procedure when at least one of the SPS opportunity or the SR opportunity occurs after the BSR prohibit timer expires.

2. The method of claim 1, further comprising preventing a communication of the BSR during the BSR Prohibit time interval.

3. The method of claim 1, wherein the logical channel is mapped with a one-to-one ratio of at least one of a signaling radio bearer or a data radio bearer.

4. The method of claim 1, wherein the BSR Prohibit time interval is defined for at least one of a terminal, a radio bearer, a group of radio bearers, a group of radio bearers that aggregate respective buffers to report a BSR, or a user equipment (UE).

5. The method of claim 1, further comprising communicating the BSR to at least one of a base station, a serving base station, a target base station, a network, a server, or an eNode B.

6. The system of claim 1, further comprising assigning at least one logical channel a respective BSR Prohibit time interval in order to provide respective Quality of Service (QoS).

7. The system of claim 1, further comprising employing a BSR timer within a Medium Access Control (MAC) that manages the BSR Prohibit time interval.

8. A wireless communications apparatus, comprising at least one processor configured to:
   receive a configuration related to a Semi-Persistent Scheduling (SPS);
   detect a Buffer Status Report (BSR) associated with a logical channel that is triggered;
   evaluate whether an SPS transmission occurs within a BSR Prohibit time interval associated with the triggered BSR;
   convey the BSR through an uplink shared channel when the SPS transmission opportunity occurs based upon the evaluation;
   detect a Scheduling Request (SR) transmission that is triggered; and
   perform a random access channel (RACH) procedure when at least one of the SPS opportunity or the SR opportunity occurs after the BSR prohibit timer expires; and
   a memory coupled to the at least one processor.

9. The wireless communications apparatus of claim 8, further comprising at least one processor configured to prevent a communication of the BSR during the BSR Prohibit time interval.

10. The wireless communications apparatus of claim 8, wherein the logical channel is mapped with a one-to-one ratio of at least one of a signaling radio bearer or a data radio bearer.

11. The wireless communications apparatus of claim 8, wherein the BSR Prohibit time interval is defined for at least one of a terminal, a radio bearer, a group of radio bearers, a group of radio bearers that aggregate respective buffers to report a BSR, or a user equipment (UE).

12. The wireless communications apparatus of claim 8, further comprising at least one processor configured to communicate the BSR to at least one of a base station, a serving base station, a target base station, a network, a server, or an eNode B.

13. The wireless communications apparatus of claim 8, further comprising at least one processor configured to assign at least one logical channel a respective BSR Prohibit time interval in order to provide respective Quality of Service (QoS).

14. The wireless communications apparatus of claim 8, further comprising at least one processor configured to employ a BSR timer within a Medium Access Control (MAC) that manages the BSR Prohibit time interval.

15. A wireless communications apparatus that enables communicating a Buffer Status Report (BSR) in a wireless communication network, comprising:
   means for receiving a configuration related to a Semi-Persistent Scheduling (SPS);
   means for detecting the Buffer Status Report (BSR) associated with a logical channel that is triggered;
   means for evaluating whether an SPS transmission occurs within a BSR Prohibit time interval associated with the triggered BSR;
   means for conveying the BSR through an uplink shared channel when the SPS transmission opportunity occurs based upon the evaluation;

means for detecting a Scheduling Request (SR) transmission that is triggered; and means for performing a random access channel (RACH) procedure when at least one of the SPS opportunity or the SR opportunity occurs after the BSR prohibit timer expires.

16. The wireless communications apparatus of claim 15, further comprising means for preventing a communication of the BSR during the BSR Prohibit time interval.

17. The wireless communications apparatus of claim 15, wherein the logical channel is mapped with a one-to-one ratio of at least one of a signaling radio bearer or a data radio bearer.

18. The wireless communications apparatus of claim 15, wherein the BSR Prohibit time interval is defined for at least one of a terminal, a radio bearer, a group of radio bearers, a group of radio bearers that aggregate respective buffers to report a BSR, or a user equipment (UE).

19. The wireless communications apparatus of claim 15, further comprising means for communicating the BSR to at least one of a base station, a serving base station, a target base station, a network, a server, or an eNode B.

20. The wireless communications apparatus of claim 15, further comprising means for assigning at least one logical channel a respective BSR Prohibit time interval in order to provide respective Quality of Service (QoS).

21. The wireless communications apparatus of claim 15, further comprising means for employing a BSR timer within a Medium Access Control (MAC) that manages the BSR Prohibit time interval.

22. A computer program product, comprising a non-transitory computer-readable medium comprising:

code for causing at least one computer to receive a configuration related to a Semi-Persistent Scheduling (SPS);

code for causing at least one computer to detect a Buffer Status Report (BSR) associated with a logical channel that is triggered;

code for causing at least one computer to evaluate whether an SPS transmission occurs within a BSR Prohibit time interval associated with the triggered BSR; and code for causing at least one computer to convey the BSR through an uplink shared channel when the SPS transmission opportunity occurs based upon the evaluation;

code for causing the at least one computer to detect a Scheduling Request (SR) transmission that is triggered; and code for causing the at least one computer to perform a random access channel (RACH) procedure when at least one of the SPS opportunity or the SR opportunity occurs after the BRS prohibit timer expires.

23. The computer program product of claim 22, wherein the non-transitory computer readable medium further comprising code for causing the at least one computer to prevent a communication of the BSR during the BSR Prohibit time interval.

24. The computer program product of claim 22, wherein the logical channel is mapped with a one-to-one ratio of at least one of a signaling radio bearer or a data radio bearer.

25. The computer program product of claim 22, wherein the BSR Prohibit time interval is defined for at least one of a terminal, a radio bearer, a group of radio bearers, a group of radio bearers that aggregate respective buffers to report a BSR, or a user equipment (UE).

26. The computer program product of claim 22, wherein the non-transitory computer readable medium further comprising code for causing the at least one computer to communicate the BSR to at least one of a base station, a serving base station, a target base station, a network, a server, or an eNode B.

27. The computer program product of claim 22, wherein the non-transitory computer readable medium further comprising code for causing the at least one computer to assign at least one logical channel a respective BSR Prohibit time interval in order to provide respective Quality of Service (QoS).

28. The computer program product of claim 22, wherein the non-transitory computer readable medium further comprising code for causing the at least one computer to employ a BSR timer within a Medium Access Control (MAC) that manages the BSR Prohibit time interval.

29. A method used in a wireless communications system that facilitates communicating a Buffer Status Report (BSR), comprising:

receiving a configuration related to a Semi-Persistent Scheduling (SPS);

detecting the Buffer Status Report (BSR) associated with a logical channel that is triggered;

evaluating whether an SPS transmission occurs within a BSR Prohibit time interval associated with the triggered BSR;

conveying the BSR through an uplink shared channel when the SPS transmission opportunity occurs based upon the evaluation; and setting the BSR Prohibit time interval to at a time span shorter than a predetermined interval, the predetermined interval being an interval for an SR transmission or an interval for an SPS transmission.

30. A wireless communications apparatus, comprising:

at least one processor configured to:

receive a configuration related to a Semi-Persistent Scheduling (SPS);

detect a Buffer Status Report (BSR) associated with a logical channel that is triggered;

evaluate whether an SPS transmission occurs within a BSR Prohibit time interval associated with the triggered BSR;

convey the BSR through an uplink shared channel when the SPS transmission opportunity occurs based upon the evaluation; and set the BSR Prohibit time interval to at a time span shorter than a predetermined interval, the predetermined interval being an interval for an SR transmission or an interval for an SPS transmission; and a memory coupled to the at least one processor.

31. A wireless communications apparatus that enables communicating a Buffer Status Report (BSR) in a wireless communication network, comprising:

means for receiving a configuration related to a Semi-Persistent Scheduling (SPS);

means for detecting the Buffer Status Report (BSR) associated with a logical channel that is triggered;

means for evaluating whether an SPS transmission occurs within a BSR Prohibit time interval associated with the triggered BSR; and means for conveying the BSR through an uplink shared channel when the SPS transmission opportunity occurs based upon the evaluation; and means for setting the BSR Prohibit time interval to at a time span shorter than a predetermined interval, the predetermined interval being an interval for an SR transmission or an interval for an SPS transmission.

32. A computer program product, comprising a non-transitory computer-readable medium comprising:

code for causing at least one computer to receive a configuration related to a Semi-Persistent Scheduling (SPS);

code for causing at least one computer to detect the Buffer Status Report (BSR) associated with a logical channel that is triggered;

code for causing at least one computer to evaluate whether an SPS transmission occurs within a BSR Prohibit time interval associated with the triggered BSR; and code for causing at least one computer to convey the BSR through an uplink shared channel when the SPS transmission opportunity occurs based upon the evaluation; and code for setting the BSR Prohibit time interval to at a time span shorter than a predetermined interval, the predetermined interval being an interval for an SR transmission or an interval for an SPS transmission.

* * * * *